United States Patent [19]

Servé et al.

[11] Patent Number: 4,769,995
[45] Date of Patent: Sep. 13, 1988

[54] AIR-FUEL RATIO CONTROLLER FOR A TURBOCHARGED INTERNAL COMBUSTION ENGINE

[75] Inventors: J. Vincent Servé; David W. Eckard, both of Springfield, Ohio

[73] Assignee: Cooper Industries, Houston, Tex.

[21] Appl. No.: 945,597

[22] Filed: Dec. 23, 1986

[51] Int. Cl.⁴ ............................................. F02D 23/00
[52] U.S. Cl. ...................................... 60/603; 123/528
[58] Field of Search ................. 60/597, 598, 602, 603; 123/528

[56] References Cited

U.S. PATENT DOCUMENTS 4,467,608  8/1984  Matushiro et al. ................... 60/602
4,496,286  1/1985  Gagnon ................................. 417/22

Primary Examiner—Stephen F. Husar
Attorney, Agent, or Firm—Eddie E. Scott; Roger L. Maxwell

[57] ABSTRACT

An air-fuel ratio controller for a gaseous-fueled, turbocharged engine having an air manifold, a gas manifold, and a turbine inlet is disclosed herein. The controller includes means for controlling air manifold pressure and means for controlling turbine inlet temperature. The means for controlling air manifold pressure includes means for providing an air manifold pressure set point signal based on gas manifold pressure and engine RPM's and at least one constant input. The means for controlling turbine inlet temperature includes means for modulating the slope of the set point signal for the air manifold pressure controller.

7 Claims, 4 Drawing Sheets

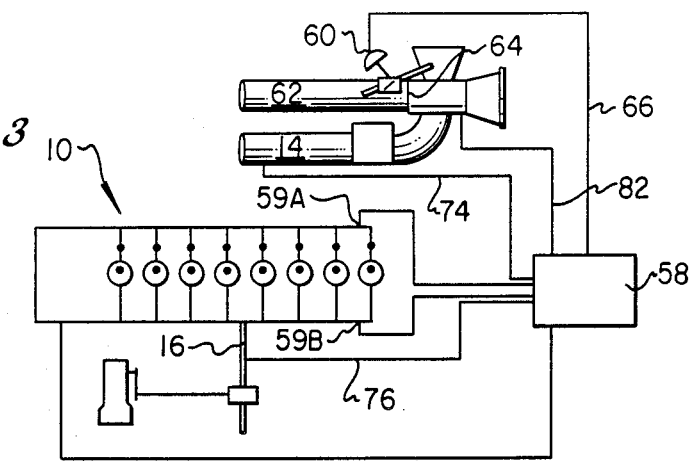
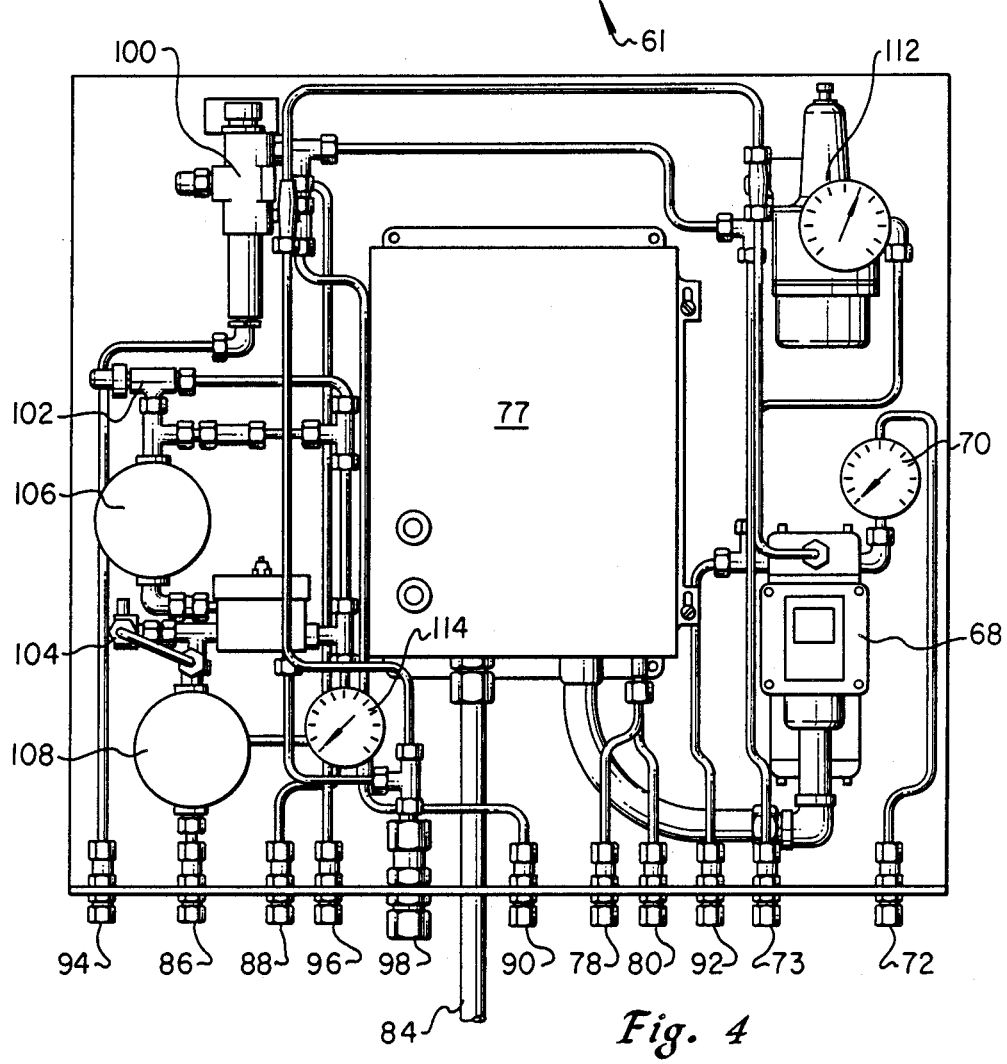
Fig. 3
Fig. 4

AIR-FUEL RATIO CONTROLLER FOR A TURBOCHARGED INTERNAL COMBUSTION ENGINE

BACKGROUND OF THE INVENTION

1. Field of the Invention

The present invention relates to a turbocharged internal combustion engine and, more particularly, to an air-fuel ratio controller for use in such an engine.

2. Description of the Prior Art

A conventional air-fuel ratio controller regulates air-to-fuel ratio by controlling air manifold pressure as a function of gas manifold pressure and engine speed. While such a controller maintains a relatively constant air-to-fuel ratio for a wide range of loads, the ratio provided by such a controller occasionally deviates from an optimum value. One such occasion arises when fuel heating values vary. Accordingly, a need for an air-fuel ratio controller which is capable of correcting for varying fuel heating values has been recognized.

SUMMARY OF THE INVENTION

The present invention satisfies the above-mentioned recognized need by including means for controlling air manifold pressure, comprising means for providing an air manifold pressure setpoint signal based on gas manifold pressure and engine RPM and at least one constant value; and means for controlling turbine inlet temperature, said means comprising means for modulating the slope of the setpoint signal for the air manifold pressure controller. Having such inclusions, the air-ratio controller of the present invention effectively operates on two levels. The first level is based on a preprogrammed gas manifold versus air manifold relationship. The second level operates to trim the first level based on a preprogrammed turbine inlet temperature versus air manifold pressure relationship. Of course, various other factors and/or variables, such as engine speed, are incorporated into both of the aforementioned relationships to attain desired results. Both levels can operate concurrently to provide excellent control of the air-fuel ratio throughout the engine's load and speed range.

Accordingly, an object of the present invention is to provide an air-fuel ratio controller more capable than the prior art of maintaining air-to-fuel ratio of internal combustion engines closer to optimum values.

Another object of the present invention is to provide an air-fuel ratio controller having the ability to compensate for changes in fuel gas composition and ambient pressure and temperature.

Still yet another object of the present invention is to provide an air-fuel ratio controller that is self-powered, requiring no battery power or backup.

A further object of the invention is to provide an air-fuel ratio controller possessing safety features to prevent damage or injury in the event of controller power failure.

Other objects, advantages, and novel features of the present invention will become apparent from the following detailed description of the invention when considered in conjunction with the accompanying drawings wherein:

BRIEF DESCRIPTION OF THE DRAWINGS

FIG. 3 is a schematic diagram of an air-fuel ratio controller according to the present invention;

FIG. 4 is a frontal view of a control panel of an air-fuel ratio controller according to the present invention;

DETAILED DESCRIPTION OF THE INVENTION

Figure 1:
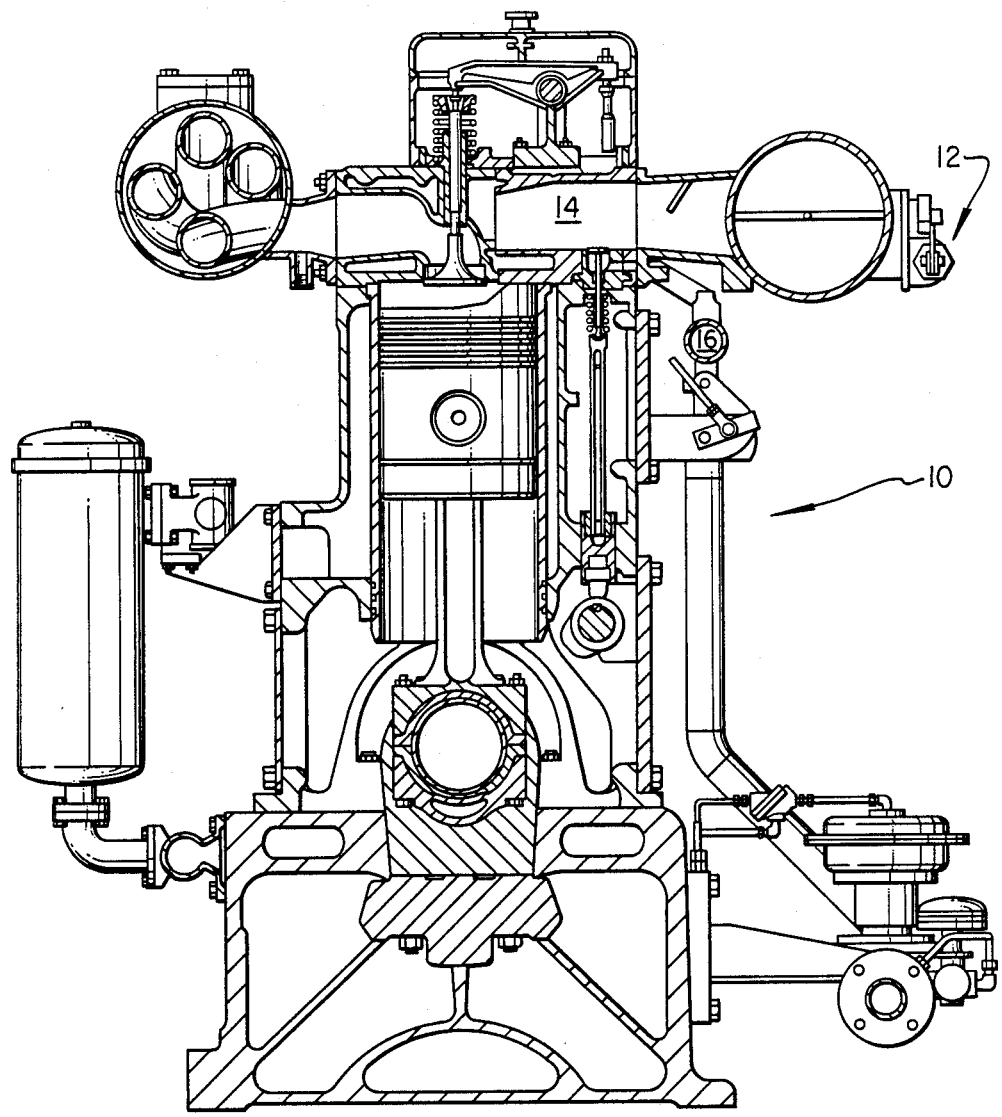
FIG. 1 is a cross-sectional view of a gaseous-fueled turbocharged internal combustion engine incorporating a prior art air-fuel ratio controller.

Referring now to FIG. 1, a gaseous-fueled, turbocharged engine is illustrated and generally designated by the reference numeral 10. Engine 10, as shown, is of a conventional and well known design, one which is used for manufacture of an engine by a division of the assignee of the present invention. As further shown, engine 10 includes an actuator 12. One such type of actuator 12, responsive to signals from an air-fuel ratio controller such as is described further below, controls a pneumatic system which establishes air manifold 14 pressure as a function of gas manifold 16 pressure.

Figure 2:
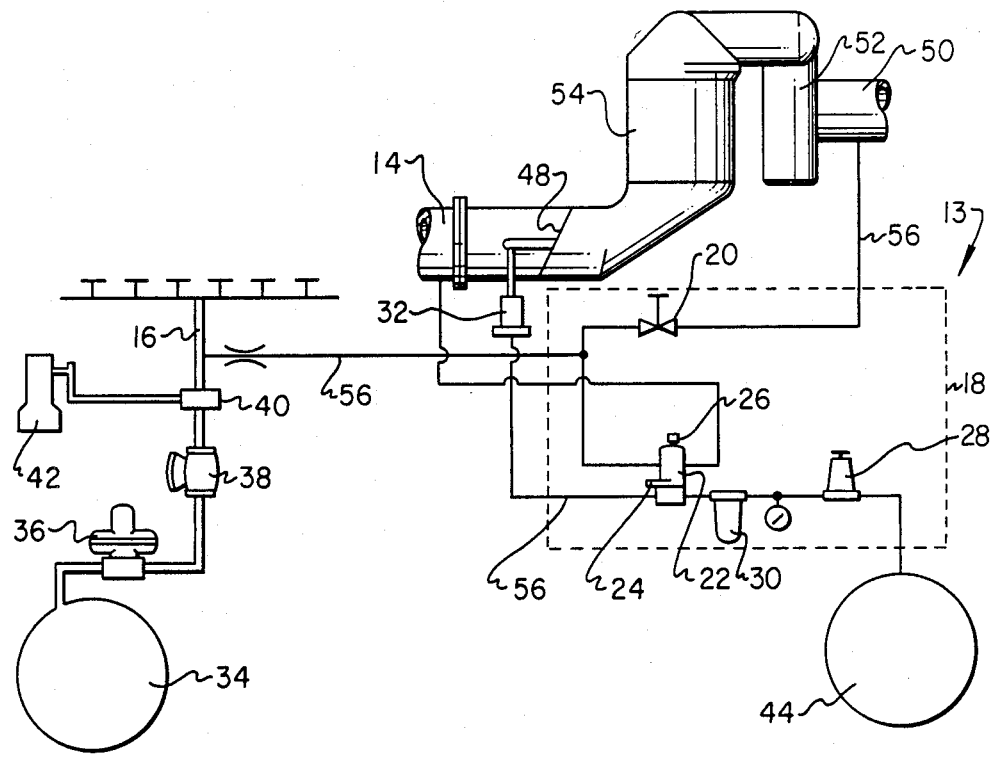
FIG. 2 is a schematic diagram of the prior art air-fuel ratio controller shown in FIG. 1.

Referring now to FIG. 2, a conventional air-fuel ratio controller 13 comprises elements included within the box formed by dashed line 18. Those elements include a high load adjustment regulating valve 20, a differential relay 22 including a damping adjustment 24 and low load adjustment 26, a regulator 28, and dryer 30. Major conventional engine and engine-associated components outside controller 13 include fuel gas supply 34, fuel gas regulator 36, shut-off and vent valve 38, gas metering valve 40, governor 42, air supply 44, air cylinder 32, butterfly valve 48, air intake 50, turbocharger 52, and intercooler 54. It should be appreciated by those skilled in the art relating to the present invention that controller 13, comprising elements 20, 22, 24, 26, 28, 30, 32, and 34, those elements being interconnected as shown in FIG. 2 by pneumatic line material 56, operates to control air manifold pressure 14 as a function of gas manifold pressure 16. As construction and operation of conventional controller 13 is well known and understood by those skilled in the art to which the present invention relates, such construction and operation will not be further described herein.

Referring now to FIG. 3, shown therein is a controller 58 according to the present invention, which controller 58 is much improved over a controller such as conventional controller 13. There are, however, some similarities between the systems shown in FIGS. 2 and 3; therefore, identical numerals, e.g. 10, 14 and 16, are used to designate like or similar elements throughout the several views.

As is understood in the art, the compressor blower of a turbocharged engine is driven by a power turbine, which, in turn, is powered by the exhaust gases from the engine. The compressed air generated by the compressor blower is supplied to an air manifold for engine 10 where it builds up a storage of air under a desired pressure. Air from the air manifold flows to the intake valves of the engine from which it is supplied to the engine. The pressure in the air manifold is controlled by the speed of the blower which, in turn, is directly controlled by the flow of exhaust through the turbine which drives the blower.

Further as understood in the art, a valve, commonly called a "wastegate," is used to regulate the amount of exhaust that flows through the power turbine. Still with reference to FIG. 3, such a valve or wastegate 60 is shown positioned, as it commonly is, between exhaust manifold 62 and turbocharger inlet 64 where it can perform its regulating function. Because of the cause and effect chain described in the preceding paragraph, that is, exhaust flow controlling blower speed controlling air manifold pressure, by regulating exhaust flow, wastegate 60 regulation directly controls air manifold pressure.

As can be further seen in FIG. 3, means 66 for transmitting a wastegate positioning signal generated by controller 58 interconnect controller 58 and wastegate 60. Such means could comprise pneumatic line material, in which case controller 58 would ultimately produce a pressure signal operable on a pressure responsive wastegate actuator. FIG. 4, which provides a view of a control panel of an air-fuel ratio controller according to the present invention, shows elements of just such a system in greater detail. The panel of FIG. 4 comprises a transducer 68 for changing an electrical signal from a microprocessor 77 to a pressure signal for operation of a conventional wastegate actuator (not shown). Those two elements, i.e., transducer 68 and microprocessor 77, are essentially identical to what is designated controller 58 in FIG. 3. Other elements shown in FIG. 4; such as gauge 70 which monitors wastegate signal pressure, coupling 72 which serves to receive a complimentarily modified end of pneumatic line material 66, and coupling 73 which serves to allow connection of a wastegate supply pressure source (not shown); perform interfacing and interconnecting, as opposed to controlling, functions.

Figure 5:
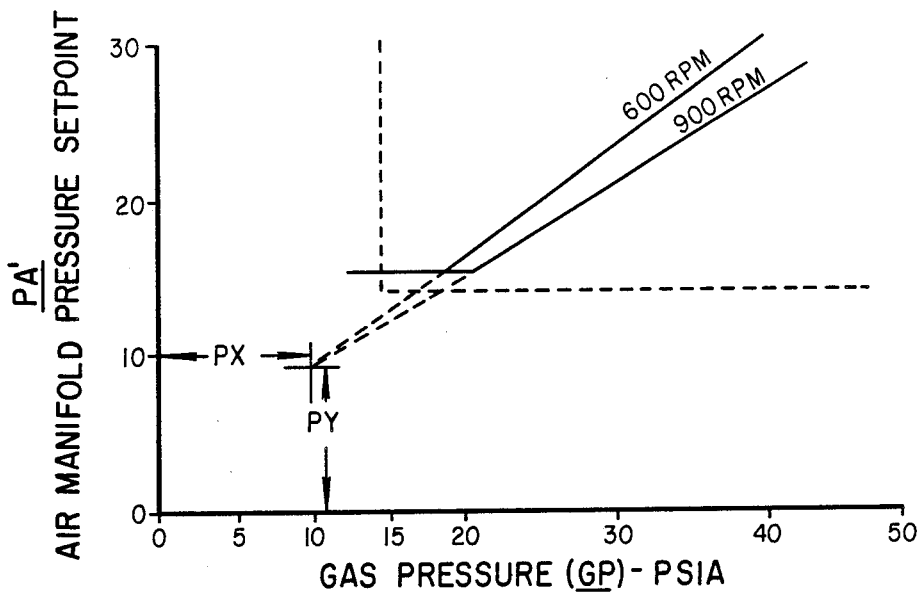
FIG. 5 is an exemplary air manifold pressure schedule programmable into an air-fuel ratio controller according to the present invention.

Referring back again to FIG. 3, controller 58 is shown to be connected to air manifold 14 by pneumatic line material 74 and to gas manifold 16 by pneumatic line material 76. In FIG. 4, couplings 78 and 80 constitute the respective places lines 76 and 74 could be properly connected to the illustrated control panel. Once so connected, and assuming microprocessor 77 is capable of performing calculations based on various inputs, which may or may not be constant, microprocessor 77 could be programmed to perform a calculation such as:

$$(PA'-PY)=[K_2-K_1(RPM-600)](GP-PX)$$

where PY, $K_2$, $K_1$, and PX are input constants representative of air pressure bias, slope of a 600 RPM curve, a slope reduction coefficient, and gas pressure bias, respectively, and where RPM's signify engine speed input to the controller by conventional means (not shown) and GP signifies gas manifold pressure input via connection 78. The equation set forth above could, with PY, $K_2$, RPM, GP, and PX inputs, be manipulated to yield PA', air manifold setpoint, implementable via the wastegate control system. FIG. 5 shows the above-defined relationship between air manifold setpoint PA' and gas manifold pressure GP graphically. Use of air manifold pressure/gas manifold pressure parameters in the control scheme of the present invention allows the engine to respond to load and speed changes rapidly. The above-described pressure loop adjusts the air manifold pressure according to engine speed determined via conventional RPM detecting system shown generally as 61 and load.

Figure 6:
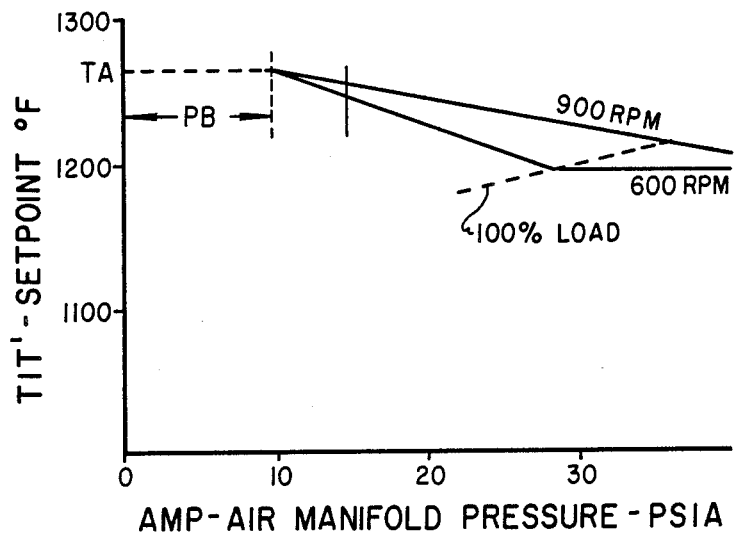
FIG. 6 is an exemplary turbine inlet temperature schedule programmable into an air-fuel ratio controller according to the present invention.

Once again referring to FIG. 3, controller 58 is shown to be connected to a point within the turbine inlet 64. At that point, temperature is sensed by temperature sensing means and transmitted, perhaps after conversion to a new type of signal, via an appropriate signal transmission line 82 to controller 58 for inclusion in the control scheme of the present invention. This inclusion is accomplished within the present invention to enable controller 58 to correct for varying fuel heating values. The controller of the present invention, via included microprocessor 77, should be able to compensate measured turbine inlet temperature for such system skewing variables as air manifold temperature (MT) and ambient temperature (AT) [by, e.g., an equation such as 0.3 (MT−130)+(100−AT)/2)] to develop a compensated turbine inlet temperature, which would enhance control system accuracy during various comparison functions, described further below. Recognizing that for a given fuel heating value and air manifold pressure the turbine inlet temperature is theoretically known and repeatable, measured and compensated turbine inlet temperature can be compared to a calculated value and, if required, the above described air manifold pressure/gas manifold pressure curve or slope of the setpoint signal for the air manifold pressure controller can be adjusted to get the correct turbine inlet temperature, thus maintaining the correct air-to-fuel ratio. FIG. 6 shows the relationship between turbine temperature set point TIT' and air manifold pressure. The equation $$(TIT'-TA)=[K_3+K_4(RPM-600)](AMP-PD)$$

with $K_3$ being the slope of TIT' vs. AMP curve at 600 RPM, $K_4$ being a slope enhancement coefficient, TA being a temperature bias and PB being an air manifold offset bias, sets forth the equation causing that relationship, which equation could be preprogrammed into microprocessor 77 for ongoing calculations.

Based on the foregoing, controller 58 effectively has two control loops. One loop is an air manifold pressure vs. gas manifold pressure control loop and the other is a turbine inlet temperature vs. air manifold pressure control loop. Neither loop has primary control. Both control loops work together to provide excellent control throughout the engine's load and speed range. However, in certain situations the controller of the present invention may be modified to place complete control on the air manifold pressure vs. gas manifold pressure control loop. For example, the temperature control can be configured to remain inoperative until the turbine inlet temperature reaches a predetermined temperature. Such configuration would operate to prevent difficulty in loading the engine from a no load condition and would cause the pressure loop to act alone in controlling the air-to-fuel ratio. Similarily, the controller could be configured to switch to the pressure loop automatically should a thermocouple fail.

Controller 58 is best powered by two engine mounted mangetic pickups (shown schematically as elements 59A and 59B) so that no separate power requirements are present. Likewise, power backup would not be necessary. If magnetic pickup should fail during engine operation, and the controller does not have enough voltage, the controller 58 can be configured to provide a signal to shut down the engine. In FIG. 4, conduit 84 designates a conduit for thermocouples and magnetic pickups connected to the illustrated control panel. Connection 86 is for a magneto ground. That ground supplies a signal pressure to a conventional magneto ground switch (not shown) which operates to ground the ignition system of engine 10. Hence, loss of signal pressure will ground the ignition system. Connection 88 is for a fuel valve signal. That signal supplies a control pressure to the fuel valves of engine 10. Hence, loss of signal pressure closes the start fuel valve and vents the run fuel valve. Connection 90 is the pressure from the fuel control valve. This pressure ungrounds the ignition and opens the fuel valves. Connection 92 is a predetermined pressure signal, e.g., 35 psi, supplied to the fuel control valve. The remaining control panel connections, connection 94 and connection 96, are for permissive signal and supply pressure respectively, and connection 98 is a vent. All of the panels components vent through connection 98. If, as in the embodiment shown in FIG. 4 along the lines of which a working model of the present invention has been constructed, natural gas is the control medium, vent 98 should be connected to a pipe, so as to "vent" at a distant, safe location. A pipe having a size based on 1 SCFM flow rate at 2 inch water column maximum allowable back pressure would be a suitable choice for such a system.

Heretofore undescribed components of the control panel shown in FIG. 4 include valves 100, 102 and 104, accumulators 106 and 108, and relay 110. Valve 100, in the embodiment shown in FIG. 4, is a 3-way 2 position valve actuatable by the permissive signal to permit the supply pressure to flow through. Valve 102 is a flow control valve that is part of the ignition off delay that delays grounding the ignition system when the engine is shut down. Valve 104 is a needle valve that adjusts the ramp signal to the start and run fuel valves. Conventional accumulator 106 adds capacity to the fuel control circuit and conventional accumulator 108 adds capacity to the ignition off-delay control circuit. Adjustable bias booster relay 110 provides control pressure to the start and run fuel valves and is capable of being adjusted for a predetermined, eg, 5 psi, pressure. Special note may be made of two additional components. Regulator 112 reduces and regulates supply pressure. In the embodiment shown in FIG. 4, which, again, has been constructed, regulator 112 is a 30–60 psig regulator adjusted for 35 psig output. Gauge 114 shows the fuel valves control pressure. In the constructed embodiment, gage 114 is a conventional 0–60 psi gauge.

Those skilled in the art should readily appreciate how the above described elements, configured as shown in the various views, cooperate to optimize air-to-fuel ratio control for an internal combustion engine much better than prior art controllers. Magnetic pickup power and other necessary connections to the various connectors 94, 86, 88, 96, 98, 84, 90, 78, 80, 92, 73, and 72 are made. The controller or control panel may include any number of displays and display mechanisms (not shown) to show preprogrammed constants and measured values. Further, other known features such as shielded leads, may be incorporated into the controller or control panel of the present invention to minimize the adverse effects of such system disrupters as electrical noise. After engine startup, when the engine is idling at, e.g., 600 rpm, panel constants should be verified. Assuming the constants are within predetermined, acceptable limits, the engine may be loaded. Thereafter, when the engine is loaded and stabilized at some load, because of the operation of the controller of the present invention, actual manifold pressure (PA) and calculated or desired air manifold pressure based on the air-fuel data constants (PA') should be equal and turbine inlet temperature compensated for ambient conditions (TIT+) and calculated or desired turbine inlet temperature on the air-fuel data constants (TIT) should also be equal. Accordingly, air-to-fuel ratio is controlled by control of air manifold pressure as a function of gas manifold pressure and turbine inlet temperature, which control inherently corrects for varying fuel heating values and maintains the air-to-fuel ratio much closer to an optimum value than do controllers lacking the herein described features and capabilities of the controller of the present invention.

Obviously many modifications and variations of this invention are possible in light of the above teachings. For example, temperature could be measured within the engine's exhaust system rather than within the turbine inlet. Of course, that is only one of numerous possible variations of the controller of the present invention. It is therefore to be understood that within the scope of the appended claims, the invention may be practiced otherwise than as specifically described.

We claim:

1. An air-fuel ratio controller for a gaseous-fueled, turbocharged engine having an air manifold, a gas manifold, and a turbine inlet, said controller comprising;
    means for controlling air manifold pressure, comprising
    means for providing an air manifold pressure set point signal based on gas manifold pressure and engine RPM's and at least one constant input; and
    means for controlling turbine inlet temperature, said means comprising
    means for modulating the slope of the set point signal for the air manifold pressure controller.

2. The controller of claim 1 further comprising controller power supplying means.

3. The controller of claim 2 wherein said controller power supplying means comprises engine mountable magnetic pickups.

4. The controller of claim 1 further comprising means for preventing operation of said means for controlling turbine inlet temperature until turbine inlet temperature is at or above a predetermined temperature.

5. The controller of claim 1 wherein said means for controlling turbine inlet temperature further comprises means for compensating turbine inlet temperature by air manifold pressure and ambient temperature and wherein said means for modulating the slope of the set point signal uses a linear function of air manifold pressure modified by revolutions per minute, pressure bias, and temperature bias.

6. An air-fuel ratio control apparatus for a gaseous fueled, turbocharged engine having an exhaust manifold, a turbine inlet, a waste gate valve position between the exhaust manifold and the turbine inlet, an air manifold, a gas manifold, and means for controlling air manifold pressure as a function of gas manifold pressure in accordance with predetermined inputs, said controller comprising:
    means for sensing temperature at the turbine inlet and producing a signal indicative thereof;
    means for determining desired turbine inlet temperature based on selected variables including air manifold pressure and producing a signal indicative thereof;

means for regulating air manifold pressure including set point setting means;

means for comparing signals indicative of sensed and desired turbine inlet temperature and controlling the means for regulating air manifold pressure and responding to that comparison so as to effectively urge actual turbine inlet temperature toward desired turbine inlet temperature.

7. The apparatus of claim 6 wherein said means for regulating air manifold pressure comprises a wastegate valve.

* * * * *